United States Patent [19]

Hixon et al.

[11] Patent Number: 4,914,268

[45] Date of Patent: Apr. 3, 1990

[54] BEAM WELDING PROCESS

[75] Inventors: Charles E. Hixon, Huffman, Tex.; Clinton J. Wohlmuth, Columbus, Ind.

[73] Assignee: Cummins Engine Company, Inc., Columbus, Ind.

[21] Appl. No.: 360,106

[22] Filed: Jun. 1, 1989

[51] Int. Cl.$^4$ .............................................. B23K 9/00
[52] U.S. Cl. ......................... 219/121.14; 219/121.64; 219/121.77
[58] Field of Search .......... 219/121.6, 121.12, 121.13, 219/121.14, 121.35, 121.63, 121.64, 121.76, 121.77, 121.85

[56] References Cited

U.S. PATENT DOCUMENTS

| | | | |
|---|---|---|---|
| 3,230,339 | 1/1966 | Opitz et al. | 219/121.14 |
| 3,417,223 | 12/1968 | Steigerwald | 219/121.14 |
| 3,763,721 | 10/1973 | Fuyakubo | 219/121.14 X |
| 4,045,646 | 8/1977 | Lichte | 219/121.13 |
| 4,229,638 | 10/1980 | Lichte | 219/121.14 X |
| 4,272,665 | 6/1981 | Steigerwald | 219/121.14 |
| 4,409,462 | 10/1983 | Jahnke | 219/121.14 |
| 4,644,127 | 2/1987 | LaRocca | 219/121.84 |

Primary Examiner—C. L. Albritton
Attorney, Agent, or Firm—Sixbey, Friedman, Leedom & Ferguson

[57] ABSTRACT

A three stage beam welding method is provided which is particularly useful for reliably joining two bulky, irregularly configured workpieces requiring a deep weld. The method is especially well suited for joining a piece to replace a broken or damaged portion of a tool to the tool body. In accordance with the present method, a first high energy beam is applied to the joint between the workpieces to penetrate the joint and to produce at least one undercut on the workpiece exterior surface, an optional second high energy beam is substantially simultaneously applied to the joint to smooth and flatten the undercut, and a third high energy beam is applied to the joint to heat treat the welded joint, thereby improving its metallic microstructure and mechanical properties. The three stages of this beam welding process may be repeated sequentially for the number of times required to produce a mechanically optimal, reliable joint between two particular workpieces.

23 Claims, 3 Drawing Sheets

BEAM WELDING PROCESS

TECHNICAL FIELD

The present invention relates generally to beam welding processes and specifically to a beam welding process which optimizes the mechanical properties of the weld.

BACKGROUND ART

The repair of a metal parent piece of equipment by the attachment of a metal replacement piece has been accomplished by various welding procedures. When welding by electron beams or laser beams is used to fasten the replacement piece to the parent piece, however, it has been discovered that the effectiveness of the weld may be limited by its depth. Beam welding to depths exceeding the width of the puddle produced, for example, may result in a surface undercut at the fusion zone interfaces. When this occurs, neither the fusion zone nor the adjacent parent metal heat-affected zones is likely to exhibit acceptable mechanical properties, and failure of the weld may orginate in one or more of these zones.

During the processes of beam, especially electron beam, welding, two metal pieces together, energy is distributed from the impingement point of the beam into the zone to be welded due to the thermal conductivity of the base material. If the energy density of the impinging beam is sufficiently high, energy is distributed into the weld zone by the direct transfer of electron beam energy from the penetrating beam. Although such electron beam welding processes have been employed effectively to join metal pieces of various shapes and sizes, they have not produced the failure free deep welds required to reliably join a large bulky metal replacement piece to an equally large or bulky metal parent piece. Electron beam welding techniques are particularly sensitive to cracks, cavities, and the presence of foreign or nonhomogeneous material in the weld zone which effectively reduce the amount of heat energy available for the weld. In addition, the high vapor pressures required in the irradiated area to produce an effective deep penetration weld may also produce temperatures far above the melting point of the welded base material. As a result, base material may be lost or changed due to escaping vapor and spraying and blowhole formation, all of which weaken the weld. Further, beam welding typically leaves the metal in the weld zone in a state that requires both additional manual processing to strengthen the weld and careful inspection to insure that no weakened areas remain.

The prior art has proposed various beam welding processes intended to produce a reliable deep weld. For example, U.S. Pat. No. 3,417,223 to Steigerwald discloses an electron beam welding process for producing a deep weld free from cracks, voids and other irregularities wherein a preheated filler material is positioned relative to the weld and to an electron beam to partially intersect the beam so that the preheated filler can fill any voids or cracks. The use of a separately preheated filler material, although it may be effective, adds an additional process step and this increases both the cost and complexity of the beam welding process.

U.S. Pat. No. 4,644,127 to LaRocca discloses a beam welding procedure wherein pieces of metal to be welded together are joined in the presence of an additional powdered filler material applied after irradiation by a laser beam and wherein the weld zone can be postheated to improve its aesthetic and mechanical characteristics. However, it is not suggested in this patent either that the powdered filler material could be eliminated or replaced or that the post-heating limits the application of the beam to an area of lesser penetration than that initially preheated to improve the properties of the metal. Moreover, although this method may be well suited to the welding of relatively shallow butt joints, it would be of limited utility in joining large, irregular masses which require deep welds.

Other beam welding methods for joining two metal pieces have been proposed in the prior art. U.S. Pat. Nos. 3,230,339 to Opitz et al. and 4,272,665 to Steigerwald are illustrative of such methods. Although these methods may be well suited to the formation of the butt joints required to join sheets or other relatively thin metal pieces wherein beam deflection across a gap and filler material supplied to a gap are easy to control, neither could be successfully applied to form the kind of deep weld required to attach a bulky, irregularly shaped replacement piece to a similarly configured patent piece.

The prior art, therefore, has failed to disclose a beam welding process suitable for attaching a bulky, irregularly shaped replacement piece to a correspondingly bulky, irregularly shaped parent piece that simultaneously prepares the weld area, creates the weld joint and then anneals and tempers the weld to optimize the mechanical characteristics of the weld, thus producing a secure permanent attachment between the replacement piece and the parent piece.

SUMMARY OF THE INVENTION

It is, therefore, an object of the present invention to overcome the disadvantages of the prior art discussed above and to provide a beam welding method suitable for permanently attaching two bulky, irregular metal workpieces.

It is another object of the present invention to provide a beam welding method capable of forming the deep welds required to permanently secure a bulky, irregular replacement piece to a similarly configured parent piece.

It is a further object of the present invention to provide a beam welding method whereby a replacement piece may be reliably joined to a parent piece without post-weld manual processing.

It is yet another object of the present invention to provide a beam welding process whereby a replacement piece may be joined to a parent piece wtih a resultant improvement in material properties.

The aforesaid objects are achieved by providing a three stage beam welding process for joining a bulky, irregularly configured metal replacement piece to a bulky, irregularly configured metal parent piece including the steps of positioning the replacement piece immediately adjacent to the parent piece so that the surfaces to be joined are in contact to form a joint; applying a first high energy beam to penetrate the joint thus formed, fusing the two pieces together and thereby producing a weld undercut; optionally applying a second high energy beam to the weld to flatten the undercut raised by said first beam; and applying a third high energy beam to the weld to heat treat the weld, thereby improving the mechanical properties of the metal adjacent to the weld. Integrally formed or added filler metal may be used to improve the appearance of the weld. The energy input of each subsequent beam is lower than that of the preceding beam to vary the extent of penetration of the beam into the welded joint. The application of the first, second and third high energy beams may be automated to occur substantially simultaneously or to be reapeated cyclically through a predetermined optimum number of cycles.

BEST MODE FOR CARRYING OUT THE INVENTION

It has been recognized that welding two metal pieces together by high energy beams may be accompanied by subsequent problems at the welded joint that could ultimately lead to failure of the joint. If beam welding is conducted at depths exceeding the approximate width of the puddle of molten metal formed as a result of the application of a high energy beam, there is a tendency for undesirable surface undercut to be produced at the fusion zone interfaces of the weld. This weakens both this fusion zone and the adjacent heat-affected zones of the metal pieces, and the weld could fail. These problems can be especially troublesome when it is desired to join two bulky, irregularly shaped metallic pieces together.

Figure 1:
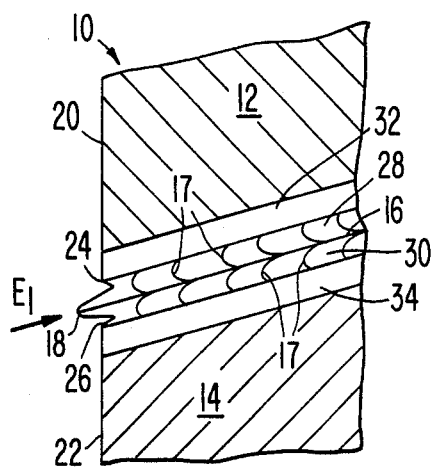
FIG. 1 is a diagrammatic representation of the first stage of the present beam welding process.
Figure 2:
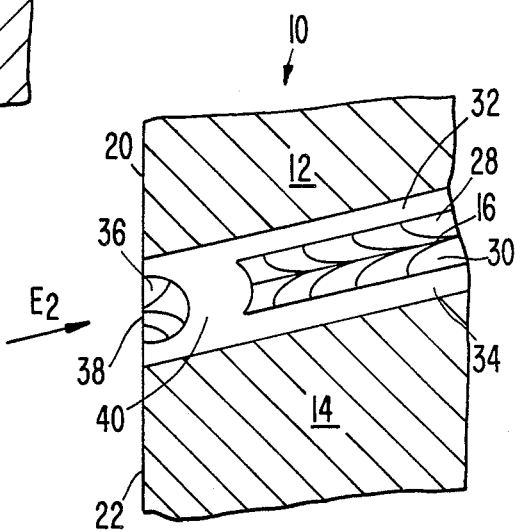
FIG. 2 is a diagrammatic representation of the second state of the present beam welding process.
Figure 3:
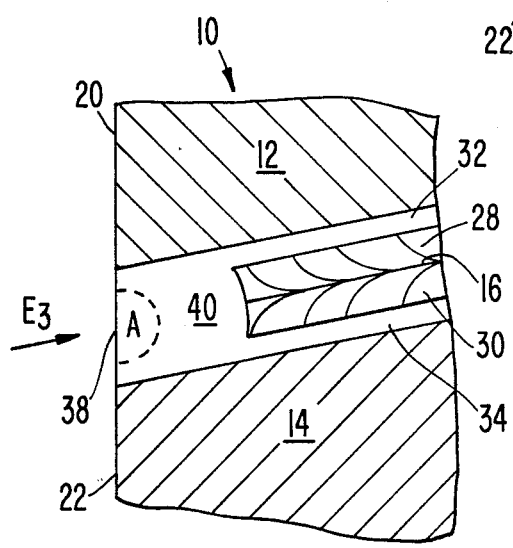
FIG. 3 is a diagrammatic representation of the thrid state of the present beam welding process.

For example, the repair and reconditioning of may different kinds of tools requires the removal of the broken or damaged portion from the tool body and its replacement with a new piece. Both the tool body and replacement piece typically are somewhat bulky and irregular in shape. The prior art beam welding methods which effectively form reliable shallow welded joints in metal sheets cannot be employed effectively to join thick metal pieces which require deep joints. The present invention provides a method whereby a thick, bulky replacement portion can be reliably attached to the equally thick body of the tool by beam welding. The beam welding process of the present invention, moreover, substantially eliminates the problems previously associated with deep welds of the type required to join a thick, bulky replacement portion to a thick tool body section. FIGS. 1-3 represent diagrammatically the three primary stages of the present process.

Referring to the drawings, FIG. 1 illustrates the first stage of one embodiment of the present welding process. The objective of this stage is to fuse two substances or workpieces together. This embodiment illustrates two workpieces, a replacement piece 14, which is welded to a parent piece 12 of a tool 10. The present process is most effectively employed to weld together two workpieces made of steel. However, it will also produce unexpected improvements in mechanical properties when used to weld workpieces made of metals that behave like steel. The replacement piece 14 is positioned immediately adjacent to parent piece 12 so that the entire surface of the replacement piece which is to be joined to the parent piece contacts the parent piece to form weld joint 16. The weld joint 16 will extend completely through the depth and thickness of the replacement piece; however, only a portion of the weld joint is shown in the drawings.

The surfaces of the parent piece 12 and replacement piece 14 which are to be welded together should be clean and free from substances that could detrimentally interface with the mechanical properties of the weld. Standard methods employed in the welding art to prepare metal surfaces for welding can be used to prepare the parent piece 12 and replacement piece 14 for welding in accordance with the present beam welding process.

A high energy beam $E_1$, represented by the arrow labeled $E_1$, is directed at the joint thus formed so that the beam can penetrate the entire depth of the joint. Although it is preferred that the beam penetrate the joint substantially completely, incomplete pentration of the joint by the beam has also been found to effectively join two metal workpieces. The kind of high energy beam preferred for this purpose is an electron beam, although a laser beam could also be used. It is also possible to use a combination of both electron beams and laser beams for this purpose. One suitable commercially available apparatus capable of producing such a high energy beam is an electron beam welder manufactured by Sciaky. This electron beam welder is capable of substantially automatic operation. Moreover, it can be easily programmed to allow the voltage, current, focus, time and other beam parameters to be modified readily.

The high energy beam selected to weld the parent piece 12 to the replacement piece 14 is focused to direct a stream of electrons through the parent and replacement pieces coincident with the weld joint 16. The beam operating parameters for the first stage are selected to insure optimum penetration of the entire depth of the weld by the beam. These parameters should also allow the beam to extend a sufficient distance perpendicularly away from the weld joint 16 into both the parent piece 12 and replacement piece 16 to create a zone of melted metal on each side of the weld joint.

The specific beam parameters for a particular weld will vary, therefore. Illustrative beam operating parameters are discussed below in connection with the Examples.

FIG. 1 illustrates diagrammatically, in crosssectional view, the appearance of the weld following the first stage of the present beam welding process. A bead 18 protrudes beyond the exterior surfaces 20 and 22, respectively, of the parent piece 12 and the replacement piece 14. A pair of undercuts 24 and 26 is produced on each side of the weld joint 16 as a result of the first stage weld.

The application of the electron beam $E_1$ to completely penetrate the weld depth during the first stage of the present process also melts the metal of the parent piece 12 and the replacement piece 14 in areas 28 and 30 of each piece, respectively, immediately adjacent to the weld joint 16.

Areas 28 and 30, which are approximately equal in size, are melted as the stream of electrons from the beam $E_1$ travels along the weld joint 16. A "keyhole" void is created by the passage of the electrons through the metal. Typically there is no molten metal in the keyhole void. The solid metal in areas 28 and 30 melts as the high energy beam passes along weld joint 16 and then resolidifies behind the beam. Curved lines 17 on either side of the weld joint 16 represent the path of travel of the beam $E_1$ to produce first molten and then resolidified metal in both the parent and replacement pieces.

The effect of the high energy beam $E_1$ is not limited to the weld joint 16 and melted areas 28 and 30, however. The temperature of both the parent piece and the replacement piece in zones 32 and 34, respectively, immediately adjacent to melted areas 28 and 30 is raised by the passage of the beam $E_1$ along weld joint 16 so that the metal in zones 32 and 34 is heated, but is not melted. The micro-structure of the metal in zones 32 and 34, which are referred to as heat-affected zones (HAZ), is affected by the increase in temperature produced by the beam $E_1$. The temperature in the heat-affected zones 32 and 34 typically becomes high enough to cause some changes in grain structure of the metal forming the parent piece 12 and the replacement piece 14 in these zones. Large grains are formed in the areas closest to the weld joint 16 heated to the highest temperatures, such as areas 28 and 30 and in HAZ 32 and 34. The grain size typically decreases as the distance from the weld joint increases. The production of smaller grains results in more desirable mechanical properties in the metal.

FIG. 2 diagrammatically represents the changes that occur to the weld joint as a result of the second stage of the present beam welding process. During stage two, the weld created during stage one is subjected to the application of a second high energy beam, represented by the arrow $E_2$. Beam $E_2$ could be either an electron beam or a laser beam and does not necessarily have to be the same kind of high energy beam as the $E_1$ beam.

The beam $E_2$ differs from the beam $E_1$ applied during stage one in that beam parameters such as voltage, current, focus and time have been modified to produce only the minimum beam penetration required to smooth out the undercuts 24 and 26 produced in stage one. Therefore, the metal of the parent and replacement pieces is melted to a shallower depth than in stage one. This can be accomplished by applying a beam $E_2$ to the weld which is, for example, lower in energy input than the $E_1$ beam, which is defocused, or which is applied for a shorter period of time than the $E_1$ beam. Either the same beam source of another beam source could be used to apply the beam $E_2$ required for stage two. For example, electron beam $E_1$ could be deflected from the number of cycles per second required to achieve the complete weld penetration of stage one to produce the beam $E_2$, which achieves only minimum penetration.

FIG. 2 illustrates the smoothing of the stage one weld bead 18 and undercuts 24 and 26 by beam $E_2$ so that only the metal in puddle 36 is actually melted. This also produces a smooth exterior weld surface 38 over the melted metal in puddle 36. The weld surface 38 thus produced is contiguous with the parent piece exterior surface 20 and the replacement piece exterior surface 22. Because the beam $E_2$ penetrates the weld only the minimum distance required to smooth the bead 18 and undercuts 24 and 26, thereby melting essentially only area 36, the temperature of the metal in heat affected zone 40 immediately behind the puddle 36 is raised by the application of beam $E_2$, but not enough to melt the metal.

The depth of undercuts 24 and 26 produced in stage one of the present process will vary in relationship to the thickness of the cross-section of the parent piece 12 and replacement piece 14 at the weld joint 16 and the depth of the weld joint 16. The undercuts created by beam $E_1$ may be deep enough to require the addition of filler metal to produce a smooth surface 38 that is coplanar with surfaces 20 and 22 rather than concave which could occur with deep undercuts. The filler can be in the form of a powder, strip or any other convenient-to-use form and is preferably applied substantially simultaneously with the application of beam $E_2$. Filler metal could also be applied to the weld joint prior to positioning the workpieces or during stage one to facilitate the production of a smooth exterior surface 38.

The primary purpose of stage two of the present process is to eliminate bead 16 and undercuts 24 and 26 and to smooth the exterior of the weld and to heat treat, but not to melt, the metal in zone 40 adjacent to the puddle 38. One result of the application of beam $E_2$ is the production of smaller grains in the metal in zone 40. This, in turn, improves the fatigue life and impact resistance of the weld.

The third stage of the process of the present invention is illustrated in FIG. 3. In this stage a third beam $E_3$ is directed at the weld site. As in the case of the $E_2$ beam, the $E_3$ beam can be a high energy electron beam or a laser beam. The three beams $E_1$, $E_2$ and $E_3$ can all be the same type of high energy beam, preferably electron or laser, or a combination of these beams. For example, the $E_1$ could be an electron beam, and the $E_2$ and $E_3$ beams could be laser beams. Many other combinations are also possible and are contemplated to lie within the scope of the present invention.

The beam $E_3$ is modified so that it differs from the $E_2$ beam with respect to such beam parameters as voltage, current, focus and time and has a lower energy input than the $E_2$ beam. Further, the $E_3$ beam may be produced by deflecting the $E_2$ beam to trail the puddle 36 formed in stage two. Alternatively, a different beam could be applied. The application of the beam $E_3$ to the puddle 36 causes this area ("A" in FIG. 3) to recrystallize by heating it to a temperature below the melting point of the metal. Area 40 (FIG. 2) is recrystallized during stage two by conductive heat from the formation of puddle 36. Area "A" is recrystallized by the radiant heat of the electron beam $E_3$. The recrystallization of this portion of the weld, which is a dendritic solidified melt, resulting from the application of heat-treating beam $E_3$ removes adverse directional properties from the metal. Additionally, grain shape and size changes in the puddle 36 occur at austenitizing temperatures, which are below the melting point of the metal.

Stage three of the present process is essentially a heat treat or an annealing and tempering step wherein the weld melt (puddle 36, areas 32 and 34) and the adjacent heat affected zones 32, 34 and 40 are heated by beam $E_3$ to eliminate the metallurgical notch effect of high hardness, steep hardness gradient and large grains. To achieve this result, it is desirable to apply beam $E_3$, which has a lower energy input than the $E_2$ beam, to the weld area for a shorter time and at a lower temperature than the beam $E_2$ is applied. The $E_3$ beam does not penetrate the weld area. Additional grain refinement of the puddle 36, areas 28 and 30, and heat affected zones 32, 34 and 40 is produced by this modified recrystallization process. The tempering which reduces localized high hardness should occur after the grain refinement is achieved by the same modified recrystallization process.

Beam $E_3$ preferably heats the weld melt to a temperature of about 1500° F., which recrystallizes the puddle 36 to improve the weld mechanical properties at a rate that allows optimal control over the process and the properties produced thereby. This temperature, however, will vary depending upon the alloy to be recrystallized. A higher temperature, e.g., 1700° F., will cause recrystallization to occur more rapidly. However, a significant loss of control over grain formation, and, hence, mechanical properties, accompanies the application of temperatures this high. At temperatures lower than 1500° F., e.g., 1000° F., recrystallization occurs more slowly, but optimal grain size is not necessarily produced. One objective of the stage three heat treatment of the weld is to avoid the production of an untempered martensite or coarse martensite type of microstructure in the weld area. Such a structure does not result in a strong, reliable weld. The optimum temperature is one that is below the melting temperature but high enough to affect an improvement in mechanical properties.

The stage three beam treatment of the present invention has been found to produce mechanical properties in the weld joint of two workpieces welded according to the present process that are significantly improved over the mechanical properties of weld joints produced by prior art beam welding processes. For example, resistance to fatigue, impact strength and tensile strength are particularly improved after stage three of the present three stage process.

It is preferred that the three weld stages described above occur substantially simultaneously or in a sequence which may be repeated a predetermined number of cycles each second to produce the optimum mechanical properties desired. The length of each weld stage and the number of cycles per second for which this process is repeated will depend on factors such as the type of metal from which the parent and replacement pieces are formed and the depth of the weld required to join the two pieces. The primary advantage to conducting the three stages substantially simultaneously is speed. The process can thus be completed very quickly. However, each stage must be completed satisfactorily before the next one starts. Moreover, with the exception of stage two, the stages should be repeated in sequence until the desired results are achieved.

The sequence in which the treatment steps are conducted has been found to be more important to achieving the improved mechanical properties produced by the present process than the number of times or the period of time for which each step is conducted. In some instances stage two could be eliminated without detrimentally affecting the end results, although this is not preferred. The second high energy beam of stage two may not be required to achieve the desired effects. Should this be the case, the process would include the application of only two high energy beams corresponding to those of stages one and three. Although stage two is not absolutely necessary to the attainment of the metallurgical objectives sought to be achieved by the present process, this stage produces improved mechanical properties in the weld area and may enhance the results of the stage three treatment.

The present three stage beam welding process has been demonstrated to be accompanied by several advantages. The described combination of process steps, which can be automated, eliminates the manual processing required by prior art beam welding processes. Because it is no longer necessary to manually weld or grind the weld after electron beam welding, product cost is reduced. In addition, product reliability and consistency are improved because the present automated beam welding process eliminates fatigue initiation points and can be programmed to apply the beams $E_1$, $E_2$ and $E_3$ at the precise energy level required for a particular weld.

Figure 4A:
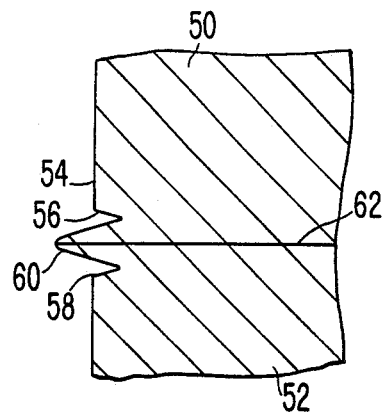
FIGS. 4a and 4b illustrate weld undercuts of two different depths formed according to the present beam welding process.
Figure 4B:
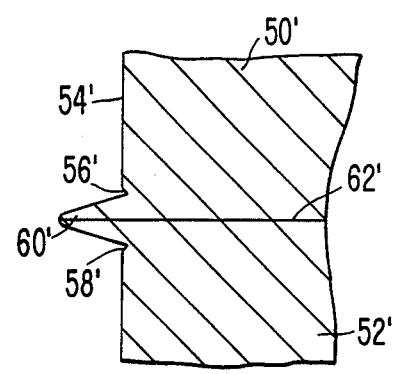

FIGS. 4a and 4b illustrate, respectively, two different undercuts formed by the application of the welding beam in stage one of the present beam welding process to join two workpieces 50 and 52. FIG. 4a illustrates the kind of deep undercuts 56 and 58 that would be produced relative to the workpiece exterior surface 54 and the weld bead 60 as a result of the application of a high energy beam to the entire depth of a deep weld joint 62. It can be clearly seen that the undercuts 56 and 58 extend well into the interior of the workpieces 50 and 52. In this case, some type of filler material would be required in stage two to produce a weld surface that is coplanar with surface 54.

FIG. 4b illustrates the undercuts 56' and 58' produced when filler metal (not shown) is added to the weld joint 62'. The distance that the undercuts 56' and 58' extend interiorly of surface 54' relative to weld bead 60' is clearly substantially less than in FIG. 4a. The addition of the filler material permits some adjustment in surface contour appearance so that a smooth exterior surface 54' in the vicinity of the weld joint 62' will be produced during the stage two treatment of the welded joint shown in FIG. 4b.

Figure 5A:
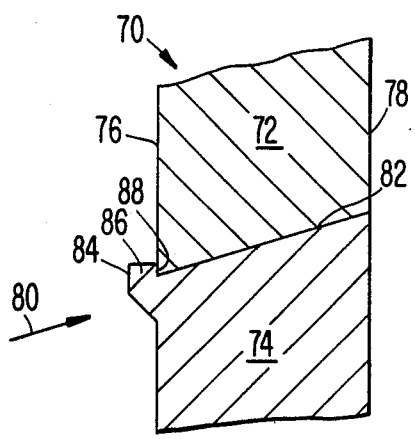
FIGS. 5a through 5c are schematic representations in side cross-sectional view of the three different joint configurations which may be used in an alternate embodiment of the present beam welding process.
Figure 5B:
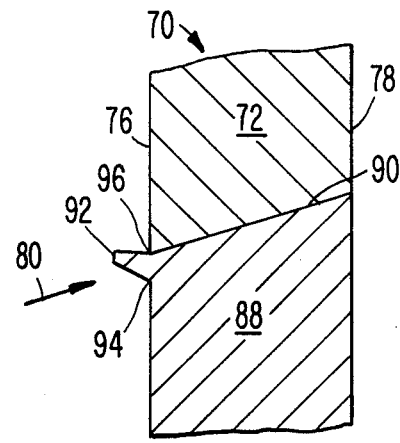
Figure 5C:
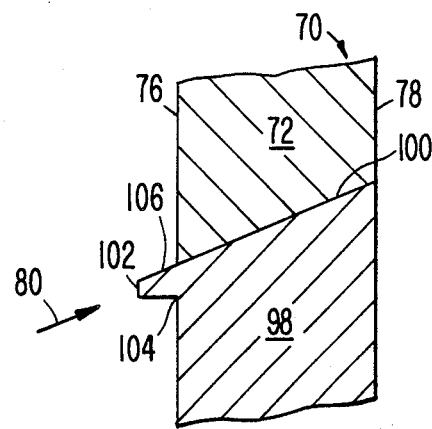

FIGS. 5a to 5c illustrate an alternate embodiment of the present invention wherein one of the workpieces to be welded is provided with an integral flange which eliminates the need to provide a separate filler material in stage two of the present beam welding process. Three different flange configuratins which provide integral filler metal, preferably on the replacement piece, are shown schematically in FIGS. 5a to 5c. In each of these figures, a replacement piece 74 is to be joined to a parent piece 72 of a tool 70 by the present beam welding process. The exterior surface of the tool 70 is shown at 76, and the inside is shown at 78. An electron beam, represented by the arrow 80, is directed at each joint in the direction of the arrow. In each of the joints in FIGS. 5a to 5c the integral flange both reduces the requirement for an undercut and eliminates the "cosmetic" weld needed to smooth an undercut. Further, a weld joint formed as described in connection with FIGS. 5a to 5c would never require manual grinding. Although these Figures illustrate the formation of an integral flange on only one piece, filler material could be formed integrally with both the parent piece and the replacement piece.

The integral flange 84 formed adjacent to the joint surface 82 of the replacement piece 74 shown in FIG. 5a performs the dual function of providing a supply of filler metal integral with the replacement piece and properly positioning the replacement piece 74 relative to the parent piece 72. The flange 84 includes lip 86 which engages edge 88 of the exterior surface 74 of the parent piece 72.

The integral flange 92 formed adjacent to the joint surface 90 of the replacement piece 80 in FIG. 5b includes an "undercut" 94 integrally formed in the replacement piece 88. This flange design is configured to form a second "undercut" 96 when the joint surface 90 of the replacement piece 88 contacts the parent piece 72.

In FIG. 5c, the integral flange 102 formed adjacent to surface 100 of the replacement piece 98 includes only one slightly angled "undercut" 104. The top edge 106 of the flange 102 is simply an extension of the joint surface 100 of the replacement piece 98. Many other integral flange designs which achieve the basic objective of providing integral filler material in conjunction with the type of weld joint described herein are also possible and are considered to fall within the scope of the present invention.

Although the beam welding process of the present invention has been described primarily with respect to the application of the welding beams to the leading edges of the welds formed thereby, the weld beams of the present process can also be applied to the trailing edges of the welded joints. The beam is simply deflected as required to apply the energy needed to weld the trailing edge in accordance with the present process.

Figure 6:
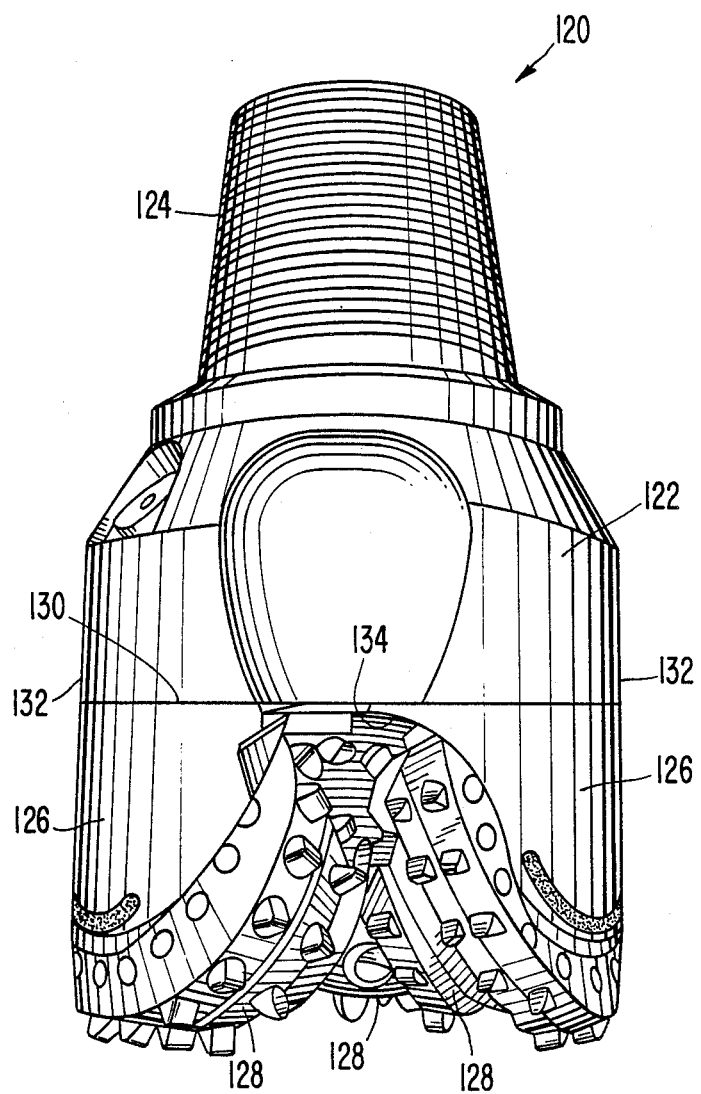
FIG. 6 illustrates one application of the present beam welding process.

FIG. 6 illustrates one specific application for which the present beam welding process is especially well-suited since the weld joints required to join the workpieces, which are bulky and irregularly configured, are deep. The tool 120 shown in FIG. 6 is a rock drill bit of the kind used to drill through deep underground rock formations for oil and water. This type of rock drill bit includes a body 122, one end of which is secured to a threaded shaft 124, and the other end of which has three integrally formed leg sections 126, only two of which can be clearly seen in FIG. 6. These leg sections support the rotating cutter cones 128 that actually cut through the rock formations during drilling. Because rock drill bits are subjected to a great deal of stress during drilling operations, breakage of one or more of the cutter cones and attached structures is not unusual. When this occurs, the drill body, which forms the bulk of the tool, typically is not broken and is able to be salvaged. The rock drill bit can then be rebuilt using the drill body 122 after removal of the broken cutter cones and supporting structures. One way in which the cutter cones may be removed from the bit body is to cut the legs supporting the cones along a line 130 throughout the entire thickness of the bit body. All three legs 128 and the attached cutter cones are then separated from the bit body 122. Three new leg portions and cutter cones 128 can then be welded, preferably one at a time, to the bit body along cutting line 130. The cutting line 130 then becomes the location where the weld joint 130 is formed when the replacement leg portion is joined to the parent bit body.

It is also possible to remove each leg 126 separately from the bit body. In this case, the cutting line would have a slightly different configuration from the substantially planar line 130 shown in FIG. 6. The surface of the replacement leg would, of course, have to be configured to correspond to the shape of the cutting line so that the replacement leg will abut the bit body as closely as possible.

Once a leg portion 126 is positioned properly with respect to the bit body 122 so that the surface of the leg portion abuts the surface of the bit body to form weld joint 130, the three stage beam welding process described herein is applied to weld joint 130 to attach the replacement leg to the parent body. Although it is not clearly illustrated in FIG. 6, weld joint 130 is not a single, contiguous linear joint, but, in fact, is three different weld joints, each of which is preferably formed separately when each replacement leg 126 is attached to the parent bit body 122. FIG. 6 does clearly illustrate the bulk and irregular configurations of the bit body and leg portions, which necessitate a weld sufficiently deep to penetrate from the exterior surface 132 to the interior surface 134 of the bit body. Despite the depths of the welds required, the enhanced mechanical properties produced in the bit body and leg by the present beam welding process has allowed the reconstruction of rock drill bits that are reliable and capable of withstanding the stresses of the drilling process.

The following Examples illustrate more specifically beam parameters of the present beam welding process found to produce welds having the enhanced mechanical properties produced by this process.

EXAMPLE 1

Two low carbon steel workpieces were welded together according to the three stage process described above in connection with FIGS. 1 to 3. The surfaces of the two pieces to be joined were cleaned according to conventional methods, and the cleaned surfaces were butted together. An electron beam generated by a Sciaky electron beam welder was directed at the joint. The beam was modified before each stage as described in Table I below to produce three beams $E_1$, $E_2$ and $E_3$. The stages were conducted sequentially, and the welded workpieces were allowed to cool ambient temperatures between stages. The stage 3 ($E_3$) beam was applied to the weld joint twice to achieve the desired metal microstructure and mechanical properties.

TABLE I

|  | Acceleration Potential (KV) | Beam Current (ma) | Rate of Travel | Focus Coil (ma) |
| --- | --- | --- | --- | --- |
| Stage 1 ($E_1$) | 60 | 500 | 8"/min | 300 |
| Stage 2 ($E_2$) | 60 | 40 | 25"/min | 335 |
| Stage 3 ($E_3$) | 60 | 15 | 25"/min | 335 |

EXAMPLE 2

Two low carbon steel workpieces were joined as in Example 1. However, a single electron beam having a constant accelerating potential, a constant beam current, and a constant rate of travel was deflected at 60 Hz at each stage by programming the electron beam welder as required. The extend of the deflection and the dwell time of the beam in the weld for each stage are set forth in Table II below. These operating parameters also effectively produced optimal mechanical properties and metallic microstructure in the weld area.

TABLE II

|  | Beam Deflection | Dwell Time |
| --- | --- | --- |
| Stage 1 ($E_1$) | 0 deg | .96 sec |
| Stage 2 ($E_2$) | 2 deg | .03 sec |
| Stage 3 ($E_3$) | 5 deg | .01 sec |

The foregoing Examples are merely illustrative of electron beam parameters that effectively produce the desired results. There are, however, many possible beam parameters that may be employed in accordance with the present three stage welding process to produce a strong, reliable deep weld joint of the kind required to join two relatively thick metal workpieces.

We claim:

1. A beam welding process for joining two bulky, irregularly configured metal workpieces including the steps of:

(a) positioning the two workpieces to be joined adjacent to each other so that the surfaces of the workpieces to be joined contact each other to form a joint, (b) applying a first high energy beam to the joint to fuse the two workpieces together and to produce at least one weld undercut;

(c) applying substantially simultaneously, a second high energy beam to the joint to flatten the undercut produced by the first beam;

(d) applying, substantially simultaneously, a third high energy beam to the joint to heat treat the welded joint; and (e) repeating steps (b), (c) and (d) to completion and in sequence for the number of times required to form a reliable welded joint with acceptable mechanical properties between the workpieces.

2. The beam welding process described in claim 1, wherein said second high energy beam has a lower energy input than said first high energy beam and said third high energy beam has a lower energy input than said second high energy beam.

3. The beam welding process described in claim 2, wherein said first, second and third beams are electron beams.

4. The beam welding process described in claim 2, wherein said first, second and third beams are laser beams.

5. The beam welding process described in claim 2, wherrein at least one of said first, second and third beams is an electron beam and at least one of said first, second and third beams is a laser beam.

6. The beam welding process described in claim 1, further including the step of simultaneously with steps (a), (b) or (c), providing a filler material in the area of the undercut.

7. The beam welding process described in claim 6, wherein said filler material is in the form of a quantity of metal separate from the workpieces.

8. The beam welding process described in claim 6, wherein said filler material is formed integrally with one of said workpieces.

9. The beam welding process described in claim 6, wherein said filler material is formed integrally with both of said workpieces.

10. The beam welding process described in claim 8, wherein said filler material comprises a flange adjacent to the surface of one workpiece to be welded configured to hold the other workpiece in the proper position for welding.

11. The beam welding process described in claim 3, wherein said process is conducted automatically.

12. The beam welding process described in claim 3, wherein said third high energy beam heats the metal adjacent to the weld joint to a temperature below the melting temperature of the metal forming the weld joint but high enough to produce an improvement in the mechanical properties of the weld.

13. The beam welding process described in claim 12, wherein said temperature is about 1500° F.

14. The beam welding process described in claim 1, wherein steps (c) and (d) are not conducted substantially simultaneously with step (b).

15. The beam welding process described in claim 1, wherein step (c) is omitted.

16. The beam welding process described in claim 3, wherein said second high energy beam is formed by deflecting said first high energy beam, and said third high energy beam is formed by deflecting said second high energy beam.

17. A method for rebuilding and reconditioning a broken or damaged metal tool comprising the steps of:

(a) removing from the tool body broken or damaged portions of the tool, thereby forming a plurality of weld surfaces on the tool body;

(b) providing a replacement piece to correspond with each tool portion removed in step (a);

(c) positioning a replacement piece on a tool body weld surface to form a joint;

(d) applying a first high energy beam to the joint formed in step (c) to penetrate the joint and to produce at least one undercut in said tool body or said replacement piece;

(e) applying, substantially simultaneously, a second high energy beam to said joint to smooth and flatten the undercut;

(f) applying substantially simultaneously, a third high energy beam to said joint to anneal and temper said joint;

(g) repeating steps (d), (e) and (f) sequentially for a number of times sufficient to reliably weld the replacement piece to the tool body; and (h) repeating steps (b) to (g) for each replacement piece required to rebuild and recondition the tool.

18. The tool rebuilding and reconditioning method described in claim 17, wherein step (e) is omitted.

19. The tool rebuilding and reconditioning method described in claim 17, wherein the tool is a rock drill bit and the replacement piece includes the terminal portion of the drill bit leg having the cutter cone attached hereto.

20. The tool rebuilding and reconditioning method described in claim 17, wherein said second high energy beam has a lower energy level than said first high energy beam and said third high energy beam has lower energy level than said second high energy beam.

21. The tool rebuilding and reconditioning method described in claim 20, wherein said first, second and third high energy beams are electron beams.

22. The tool rebuilding and reconditioning method described in claim 20, wherein said first, second and third high energy beams are laser beams.

23. The tool rebuilding and reconditioning method described in claim 20, wherein at least one of said first, second and third high energy beams is an electron beam and at least one of said first, second and third high energy beams is a laser beam.

* * * * *